United States Patent
Schier

(10) Patent No.: US 6,976,176 B1
(45) Date of Patent: Dec. 13, 2005

(54) METHOD, DEVICE, AND NETWORK FOR PROVIDING SECURE COMMUNICATION ENVIRONMENTS

(75) Inventor: John Elmore Schier, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 945 days.

(21) Appl. No.: 09/658,873

(22) Filed: Sep. 8, 2000

(51) Int. Cl.$^7$ .............................................. H04L 9/00
(52) U.S. Cl. ...................... 713/201; 713/200; 713/153; 713/165; 713/167; 713/189
(58) Field of Search ................. 713/200–202, 713/164–167, 189; 380/247–250, 270–275; 705/51

(56) References Cited

U.S. PATENT DOCUMENTS

| | | | | |
|---|---|---|---|---|
| 5,450,493 A | * | 9/1995 | Maher ......................... 380/30 |
| 5,455,861 A | | 10/1995 | Faucher et al. ................. 380/9 |
| 5,784,566 A | | 7/1998 | Viavant et al. ......... 395/200.59 |
| 5,787,154 A | | 7/1998 | Hazra et al. ............. 379/93.03 |
| 6,229,895 B1 | * | 5/2001 | Son et al. ................... 380/200 |
| 6,252,869 B1 | | 6/2001 | Silverman .................... 370/352 |
| 6,266,418 B1 | | 7/2001 | Carter et al. ................. 380/257 |
| 6,321,336 B1 | * | 11/2001 | Applegate et al. .......... 713/201 |
| 6,397,259 B1 | * | 5/2002 | Lincke et al. ............... 709/236 |
| 6,546,016 B1 | * | 4/2003 | Gerszberg et al. .......... 370/401 |
| 6,587,684 B1 | * | 7/2003 | Hsu et al. .................... 455/419 |
| 6,643,701 B1 | * | 11/2003 | Aziz et al. .................. 709/227 |
| 6,671,810 B1 | * | 12/2003 | Jardin ......................... 713/201 |
| 2001/0040885 A1 | * | 11/2001 | Jonas et al. .................. 370/352 |
| 2001/0048745 A1 | * | 12/2001 | Sheymov et al. ........... 380/247 |
| 2001/0055395 A1 | * | 12/2001 | Vogler ......................... 380/273 |
| 2003/0033522 A1 | * | 2/2003 | Bilgic et al. ................ 713/168 |

* cited by examiner

Primary Examiner—Gregory A. Morse
Assistant Examiner—Tongoc Tran
(74) Attorney, Agent, or Firm—Baker Botts L.L.P.

(57) ABSTRACT

The present invention is directed towards a method, device, and network for providing secure communication environments. In one form, a communication network operable to provide a secure communication environment is disclosed. The communication network includes a communication device operable to request the secure communication environment. The communication network further includes a communication server operable to be coupled to the communication device to enable the secure communication environment.

41 Claims, 2 Drawing Sheets

METHOD, DEVICE, AND NETWORK FOR PROVIDING SECURE COMMUNICATION ENVIRONMENTS

CROSS REFERENCE TO RELATED APPLICATION

This application is related to copending Application Ser. No. 09/657,415 filed Sept. 8, 2000 entitled Method, Device, and Network for Providing Selectable Secure Communication Environments, by John Elmore Schier.

TECHNICAL FIELD

The present invention generally relates to communicating information, and more particularly, to a method, device, and network for providing secure communication environments.

BACKGROUND

Secure environments for communicating information is an ongoing concern in the field of communications. Historically, government agencies have used many different types of data encryption to obviate interception of communicated information between parties. Commercially, several techniques have been deployed to reduce or eliminate communications from being intercepted. For example, some conventional wireless telephone systems deploy spread spectrum as a form of wireless communication in which the frequency of the transmitted signal is deliberately varied resulting in greater bandwidth than the signal would have if its frequency were not varied. For example, a conventional wireless signal has a frequency, usually specified in megahertz(MHz) or gigahertz (GHz), that does not change with time (except for small, rapid fluctuations that occur as a result of modulation). The signal will stay at approximately 103.1 MHz and may vary up to 105.1 MHz or down to 99.1 MHz. Some conventional wireless telephones maintain the signal constant so the bandwidth can be kept within certain limits and the signal can be easily located by someone who wants to retrieve the information.

Given that a constant frequency signal is relatively easy to intercept, it is therefore not well suited to applications in which information must be kept confidential between the source (transmitting party) and destination (receiving party).

To minimize troubles that can arise from the above mentioned vulnerabilities of conventional communications circuits, the frequency of the transmitted signal can be deliberately varied over a comparatively large segment of the electromagnetic radiation spectrum. This variation is done according to a specific, but complicated mathematical function. In order to intercept the signal, a receiver must be tuned to frequencies that vary precisely according to this function. The receiver must "know" the frequency-versus-time function employed by the transmitter, and must also "know" the starting-time point at which the function begins. If someone wants to jam or intercept a spread-spectrum signal, that person must have a transmitter that "knows" the function and its starting-time point. The spread-spectrum function must be kept out of the hands of unauthorized people or entities to protect security of the associated communication.

Most spread-spectrum signals use a digital scheme called frequency hopping. The transmitter frequency changes abruptly, many times each second. Between "hops," the transmitter frequency is stable. The length of time that the transmitter remains on a given frequency between "hops" is known as the dwell time. A few spread-spectrum circuits employ continuous frequency variation, which is an analog scheme.

SUMMARY OF THE INVENTION

In accordance with teachings of the present invention, a system and method are described for providing secure communication of information via a network environment.

According to one aspect of the present invention, a communication network operable to provide a secure communication environment is provided. The communication network includes a communication device operable to request the secure communication environment and a communication server operable to be coupled to the initiating device. The communication server is further operable to enable the secure communication environment.

According to another aspect of the present invention, a method for providing a secure communication environment. The method includes determining availability of the secure communication environment in response to a request by a communication device and providing a reference to the communication device operable to be used in association with enabling the secure communication environment.

According to another aspect of the present invention, a communication device operable to communicate via a communication network is disclosed. The communication device includes a user interface operable to initiate communication with a communication server coupled to the communication network and a processor operable to process information based upon an algorithm identified by the communication server.

According to a further aspect of the present invention, a method for providing a secure communication environment using a communication device is disclosed. The method includes initiating communication with a communication server to request a secure communication environment and processing information based upon an algorithm identified by the communication server to provide the secure communication environment.

According to another aspect of the present invention, a system for providing a secure communication environment using a communication device is disclosed. The system includes initiating communication with a communication server and processing information by the initiating device based upon an algorithm identified by the communication server.

According to another aspect of the present is invention, a communication network operable to provide a secure communication environment is disclosed. The network includes an initiating device operable to request the secure communication environment and a destination device operable to communicate information via the secure communication environment. The network further includes a communication server operable to be coupled to the initiating device to determine if the initiating device and the destination device are operable to communicate via the secure communication environment.

It is a technical advantage of the present invention to provide an enhanced data and voice services for communication devices.

It is technical advantage of the present invention to provide a user selectable communication environment for communication devices.

It is further technical advantage of the present invention to provide an optional service for providing secure communication environments which may be activated on a per-call basis.

It is a technical advantage of the present invention to provide a communication device operable to communicate via secure and non-secure communication environments.

It is another technical advantage of the present invention to provide a destination device operable to communicate information via a selectable secure communication environment.

It is another technical advantage of the present invention to provide an on-demand system operable to provide a secure communication service for several subscribers.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 5, wherein like numbers are used to indicate like and corresponding parts.

The conceptual groundwork for the present invention involves securely communicating information via a network. A secure communication environment may be selectively enabled by a user accessing a network using a communication device. The user may initiate a secure communication environment and communicate information to a destination device operable to receive information communicated via the secure communication environment.

In a particularized form, an initiating device, such as a telephone or wireless communication device, may be used to establish communication with a destination as device. The destination device may be coupled to the initiating device via a network operably coupled to a communication server. A user may selectively enable a secure communication environment by selecting a key or a series of keys operably coupled to the initiating device. As such, the communication server may determine availability of a secure communication environment and initiate providing the secure communication environment. In one embodiment, the server may determine a type of encryption to be used in association with the initiating device and the destination device. As such, the communication server may provide an instruction to the initiating device and/or the destination device identifying an algorithm to be used for encrypting and/or decrypting information.

Figure 1:
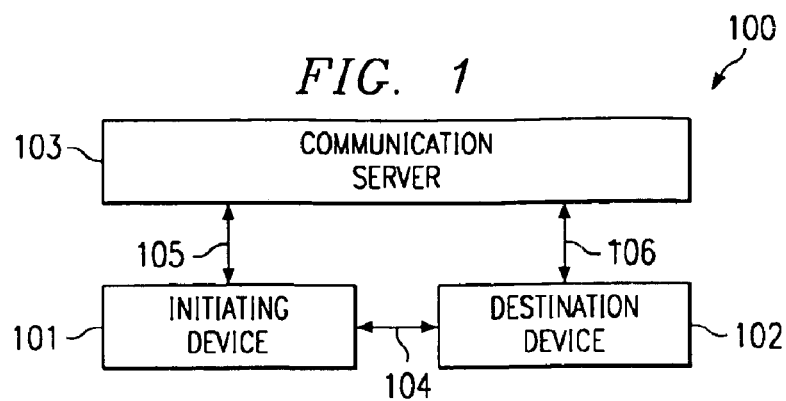
FIG. 1 illustrates one embodiment of a communication network operable to deploy a secure communication environment according to teachings of the present invention.

FIG. 1 illustrates one embodiment of a communication network operable to deploy a secure communication environment according to teachings of the present invention. A communication network, illustrated generally at 100, includes an initiating device 101 operably coupled to a destination device 102 via a first network 104. Initiating device 101 may also be coupled to communication server 103 via a second network 105. Communication server 103 may also be coupled to destination device 102 via third network 106.

During use, communication network 100 may be operable to provide secure communication of information between initiating device 101 and destination device 102. For example, a user may request a secure environment using initiating device 101. Communication server 103 may receive a request from initiating device 101 and determine if a secure communication environment may be provided between initiating device 101 and destination device 102. For example, communication server 103 may determine if an algorithm may be used by both initiating device 101 and destination device 102. As such, communication server 103 may provide an instruction to initiating device 101 and destination device 102 identifying which algorithm to use to provide a secure communication environment.

In one embodiment of the present invention, communication server 103 may determine that a partially secure environment may be provided. For example, destination device 102 may not be operable to deploy an algorithm similar to an algorithm which may be used by initiating device 101. As such, communication server 103 may remain communicably coupled between initiating device 101 and destination device 102 and may be operable to deploy an algorithm similar to the algorithm deployed by initiating device 101. Communication server 103 may then provide a partially secure communication environment with secure communication between initiating device 101 and communication server 103 and generally non-secure communication between communication server 103 and destination device 102.

In another embodiment, initiating device 101 and/or destination device 102 may be operable receive an algorithm communicated by communication server 103. For example, communication server 103 may download a common algorithm to initiating device 101 and destination device 102 which may be used to encrypt and/or decrypt information. As such, communication server 103 may provide various algorithms thereby providing a secure communication environment which may be periodically altered between initiating device 101 and destination device 102.

Figure 2:
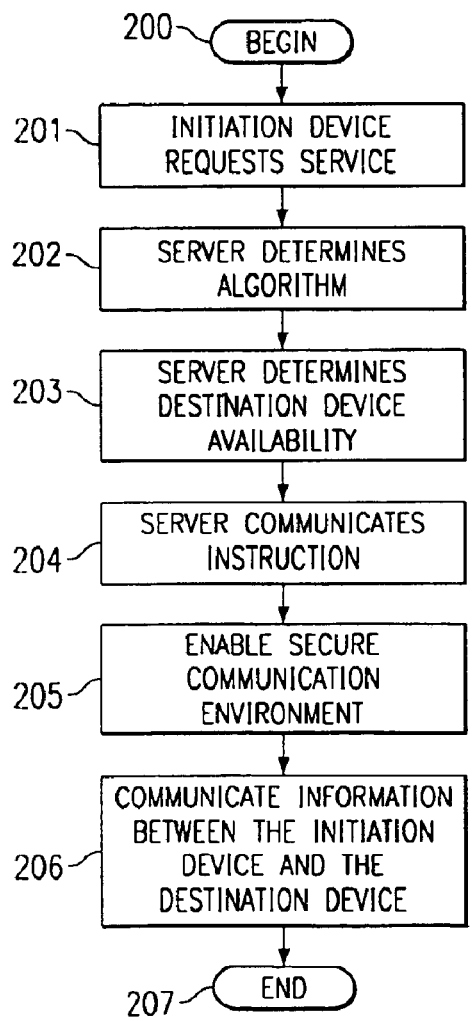
FIG. 2 illustrates one embodiment of a method for providing a secure communication environment using networked devices according to teachings of the present invention.

FIG. 2 illustrates one embodiment of a method for providing a secure communication environment using networked devices according to teachings of the present invention. The method may be deployed in association with the network illustrated in FIG. 1 or other networks or systems operable to deploy the method of FIG. 2.

The method begins generally step 200. At step 201 initiation of a secure communication environment is requested. Initiation may include a user selecting a series of keys associated with a communication device. For example, a user may request a secure environment by selecting '*33' on a keypad associated with the communication device. In another embodiment, a communication device may initiate a request using a program of instructions operable to initiate a request for a secure communication environment. Upon initiating a request for a secure environment, the method proceeds to step 202 where a communication server determines an algorithm to be used in association with providing a secure environment. For example, the communication server may include a database of selectable algorithms which may be used by the initiating communication device.

Additionally, a plurality of algorithms may be stored within the initiating communication device and operable to provide a plurality of different types of encryption. As such, the communication server may identify an algorithm to be used by the initiating device and communicate an instruction identifying an algorithm operable to encrypt and decrypt information.

In another embodiment, a communication server may communicate or download to the initiating communication device an algorithm representing a type of encryption to be used for a secure communication environment. For example, the communication server may communicate an algorithm operable to be stored by the initiating communication device and used to encrypt and decrypt information communicated to and from the initiating communication device. As such, various algorithms representing various encryption's may be selectively downloaded to a communication device by a communication server thereby providing several secure communication environments.

Upon the server determining a secure communication environment, the method proceeds to step 203 where the communication server determines if a destination device may be operable to communicate information via a secure communication environment. For example, an initiating device may be operable to encrypt information based upon a particular algorithm. As such, the communication server may determine if a destination device may be a operable to process the encrypted information communicated by the initiating device using the particular algorithm. In this manner, the same algorithm may be used to encrypt and decrypt information communicated between an initiating device and a destination device.

In one embodiment, the initiating device may be operable to encrypt and decrypt communicated information but a destination device may not be operable to encrypt and decrypt the communicated information. As such, the method may be operable to provide a secure communication environment between the initiation device and a communication server operable as an encryption server for encrypting and decrypting communicated information. Information may then be communicated by the initiating device, decrypted and/or encrypted by the encryption server, and communicated to the destination device. In this manner, a secure communication environment may be provided between the initiating device and communication server thereby providing a partially secure communication environment.

Upon determining if a secure environment may be established, the method proceeds to step 204 where the server communicates an instruction identifying an algorithm to be used to provide a secure communication environment. For example, the communication server may provide a reference or instruction to the initiating device and the destination device identifying the type of algorithm or encryption to provide a secure communication environment. For example, the method may determine that a sixteen-bit, thirty-two bit, etc. encryption algorithm may be used to provide the secure communication environment. As such, the communication server would provide a reference or instruction to the initiating device and the destination device such that a secure is communication environment may be established.

Upon providing a reference or instruction identifying an algorithm, the method proceeds to step 205 where communication may be enabled between the initiating device and the destination device using the identified algorithm. For example, information communicated from the initiating device may be encrypted using the identified algorithm. The encrypted information may then be communicated to the destination device using conventional communication mediums such as land-lines, cellular, wireless, or other mediums operable to communicate information to the destination device. The information may then be received by the destination device and decrypted as required. In this manner, a secure communication environment may be provided between the initiating device and the destination device ensuring the integrity of a secure communication.

Upon enabling a secure communication environment, the method proceeds to step 206 where information may be communicated between the initiating device and the destination device via a secure communication environment. For example, a first user may initiate a phone call using a cordless telephone to a cellular telephone of a second user. As such, each device may utilize a similar algorithm to encrypt and decrypt a phone conversation thereby providing a secure communication environment.

Upon communicating information the method proceeds to step 207 where the method ends. In this manner, a secure communication environment may be established between an initiating device and a destination device for securing communicating information.

In one embodiment, the method of FIG. 2 may be deployed using a telephone and a computer system operable as a telephone, and a communication server identifying an algorithm to be used to encrypt communicated information. As such, a cordless phone user may select a reference, such as a series of keys, to initiate a secure communication environment between the telephone and the computer system. A communication server may then determine an algorithm to be used by both the phone and the computer system. Upon the communication server determining the algorithm, the server may communicate an instruction identifying the algorithm to each device. As such, a corresponding algorithm may be deployed to encrypt and decrypt information communicated between the telephone and the computer system.

Figure 3:
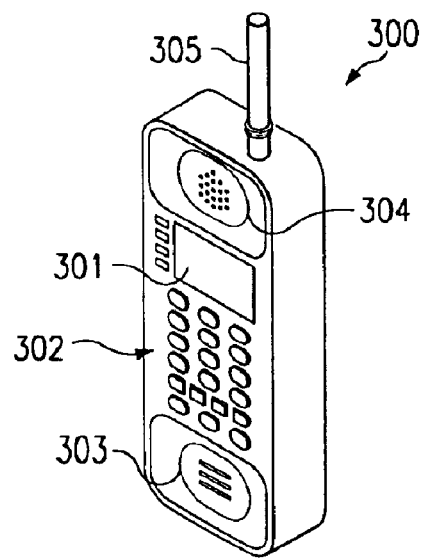
FIG. 3 illustrates one embodiment of a communication device operable to securely communicate information according to the teachings of present invention.

FIG. 3 illustrates one embodiment of a communication device operable to securely communicate information according to teachings of the present invention. A communication device, illustrated generally at 300, includes a display 301, an keypad 302, a microphone 303, a speaker 304, and an antennae 305. Communication device 300 may be operable as a cordless telephone for communicating telephonic information to a communication device. Communication device 300 may include a communication module (not shown) operable to process and communicate information via a wireless medium. Such communication may include using Radio Frequencies (RF) at, for example, 900 MHZ deploying Spread Spectrum Communication of RF signals.

Communication device 300 may also be operable to deploy an algorithm stored within a storage medium (not shown) coupled to communication device 300. For example one or more 16-Bit encryption algorithms may be stored within the storage medium.

During use, a user may select one or more keys to initiate a secure communication environment. For example, a user may select '*33' to request a secure communication service from a service provider. As such, the communication server may provide communication device 300 with an instruction indicating which algorithm stored within the storage medium may be used to encrypt and decrypt communicated information. In this manner, communication device 300 may use different algorithms identified by a communication server to provide a secure communication environment.

In one embodiment, communication device 300 may be operable to receive and download an algorithm for encrypting and decrypting communicated information. For example, communication device 300 may include memory for storing a downloaded algorithm communicated by a communication server operable for encrypting and decrypting information. As such, communication device 300 may be programmed by a communication server at different times to provide various secure communication environments.

As illustrated in FIG. 3, communication device 300 may be operable as a cordless telephone. However, it should be understood that communication device 300 may include various devices such as a wireless communication device, a computer system, a telephone, a cordless telephone, a cellular telephone, a multifunctional machine, a fax machine, or other systems and devices operable to provide a secure communication environment via a server selected algorithm or encryption technique.

Figure 4:
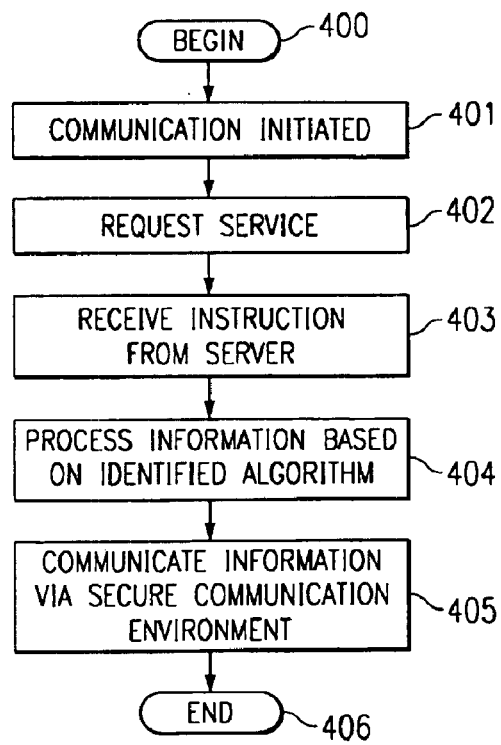
FIG. 4 illustrates one embodiment of a method for communicating information using a communication device and a secure communication environment according to the teachings of present invention.

FIG. 4 illustrates one embodiment of a method for securely communicating information using a communication device according to teachings of the present invention. The method may be deployed using the system illustrated in FIG. 3 or other systems operable to deploy the method illustrated in FIG. 4. As step 401, communication may be initiated by a communication device operable to communicate with a destination device via a network. For example, a user may initiate communication by picking up a receiver coupled to a telephone. The method then proceeds to step 402 where the communication device requests secure communication service from a service provider. For example, a user may select a series of keys for a requested service. As such, the request may be received by a communication server operable to determine if a secure communication environment may be deployed.

The method then proceeds to step 403 where the communication device receives an instruction identifying an algorithm to be used for providing a secure communication environment. For example, the electronic device may include several algorithms stored within a memory associated with the electronic device. The communication server may then communicate an instruction identifying which algorithm to be used in association with providing a secure communication environment.

The method then proceeds to step 404 where the electronic device processes the information based upon the identified algorithm. For example, the electronic device may encrypt and/or decrypt information using a 32-bit encryption technique. Upon processing the information, the method proceed to step 405 where information may be communicated by the initiating device to the destination device via a secure communication environment. The method then proceeds to step 406 where the method ends.

Figure 5:
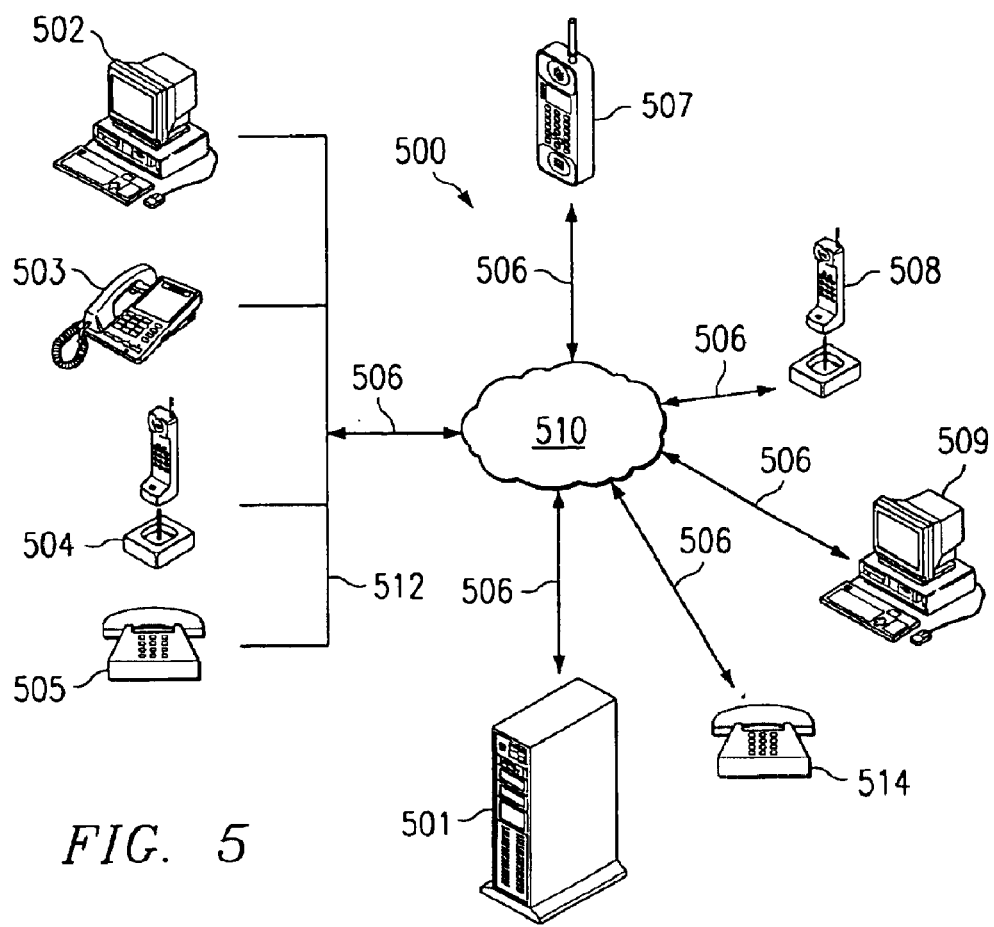
FIG. 5 illustrates another embodiment of a communication network operable to deploy a secure communication environment according to teachings of the present invention.

FIG. 5 illustrates one embodiment of a communication network operable to deploy a secure communication environment according to teachings of the present invention. A communication network, illustrated generally at 500, includes a communication server 501 coupled to a network 510 via communication medium 506 for establishing communication between one or more communication devices. Communication server 501 may be operable to couple one or more devices such a computer system 502, telephone 505, a multifunctional machine 502, a cordless telephone 504, or other devices operable to be connected to communication medium 506. In one embodiment, communication medium 506 may be operable to be connected to a premises network 512 which may be operable as a residential or business network.

Communication network 500 may also include several devices operable to communicate with one or more communication devices via premises network 512. A plurality of devices may be located proximal or distal to communication server 501 and may include, for example, a wireless communication device 507, a second cordless telephone 508, a second telephone 514, a second computer system 509 or other devices operable to communicate via communication network 500. For example, wireless communication device 507 may be configurable as a wireless personal digital assistant, a portable or laptop computer, a two-way radio, or other wireless communication devices operable to communicate via communication network 500.

During use, communication may be initiated by a device operable to communicate using communication network 500. For example, a user may initiate a phone call using cordless telephone 504. A secure communication environment may be initiated by the user selecting a key or a series of keys associated with cordless telephone 504. For example, a user may select a series of "*33" on a handset associated with cordless telephone 504 to request a special service for initiating a secure communication environment. As such, communication server 501 may determine if a secure communication environment may be provided and send an instruction or signal to cordless telephone 504 in response to determining if a secure communication environment may be provided.

In one embodiment, cordless telephone 504 may be operable to deploy one or more types of algorithms operable to encrypt information communicated by cordless telephone 504. As such, communication server 501 may provide cordless telephone 504 an instruction identifying an algorithm to be used during communication of information. Cordless telephone 504 may then utilize the selected algorithm to encrypt information prior to communicating information to a destination device and decrypt communicated information as required. In this manner, a secure communication environment may be provided for communicating information.

In another embodiment, a secure communication environment may be provided between an initiating communication device, such as telephone 505, and a destination communication device such as wireless communication device 507. A user may request a secure communication environment by initiating a service request with communication server 501. Communication server 501 may then determine an algorithm to be used by telephone 505 and wireless communication device 507. Communication server 501 may then provide an instruction to telephone 505 and wireless communication device 507 identifying an algorithm to be used to encrypt and decrypt information.

In another embodiment, communication server 501 may be operable as an encryption server for encrypting and decrypting communicated information. For example, a secure communication environment may be established between an initiating device, such as first computer 502 and communication server 501. Additionally, a non-secure communication environment may be established between communication server 501 and a destination device such as second cordless telephone 508. As such, information may be encrypted by first computer system 502 and communicated via a secure communication environment to communication server 501. Communication server 501 operable as an encryption server, may then decrypt the information and communicate the information to second cordless telephone 508. In this manner, a partially secure communication environment may be provided by communication network 500 for communicating information.

As illustrated in FIG. 5, a secure communication environment may be provided between a plurality of communication devices. For example, communication may be initiated by first computer system 502 and wireless communication device 507. First computer system 502 may be operable to allow a user to initiate a telephone call using a microphone and software operably associated with first computer system 502. As such, the user may initiate secure communication with wireless communication device 507 via communication server 501. The user may select a key, a series of keys, a graphical user interface icon, etc. to initiate a service request with communication server 501. Communication server 501 may then provide an instruction to first computer system 502 associated with an algorithm for encrypting and decrypting information communicated during the telephone call. As such, first computer system 502 may be operable to encrypt and decrypt information communicated during a telephone call between first computer system 502 and wireless communication device 507.

In another embodiment, communication server 501 may be operable to provide or download an algorithm to a communication device prior to establishing a secure communication environment. For example, communication server 501 may download an algorithm to an initiating device operable to receive and utilize an algorithm. As such, an initiating device, such as wireless communications device 507, may receive the algorithm downloaded by communication server 501 and utilize the algorithm to encrypt and decrypt information. As such, a different secure communication environments may be provided using various algorithms as determined by communication server 501.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A system for securing communications comprising:
   an initiating device operable to transmit to a communication server a first request for security of first communications with a first destination device, the initiating device further operable to transmit to the communication server a second request for security of second communications with a second destination device;
   the communication server operable to couple to the initiating device and the first destination device, to receive the first request, to select a first algorithm for securing the first communications, to transmit to the initiating device first information identifying the first algorithm, to determine that the first destination device supports encryption of the first communications, and to transmit to the first destination device the first information in response to determining that the first destination device supports encryption of the first communications, the communication server further operable to couple to the second destination device, to receive the second request, to select a second algorithm for securing the second communications, to transmit to the initiating device information identifying the second algorithm, to determine that the second destination device does not support encryption of the second communications, to establish an encrypted link with the initiating device in response to determining that the second destination device does not support encryption of the second communications, and to establish an unencrypted link with the second destination device in response to determining that the second destination device does not support encryption of the second communications;
   the first destination device operable to receive the first information, to encrypt a first message for communication to the initiating device using the first algorithm, and to decrypt a second message received by the first destination device using the first algorithm; and
   the second destination device operable to transmit a third message to the initiating device through the communication server and to receive a forth message from the initiating device through the communication server.

2. A system for securing communications comprising:
   an initiating device operable to transmit to a communication server a request for security of communications with a destination device;
   the communication server operable to couple to the initiating device and the destination device, to receive the request, to select an algorithm for securing the communications, to transmit to the initiating device information identifying the selected algorithm, to determine that the destination device supports encryption of the communications, and to transmit to the destination device the information in response to determining that the destination device supports encryption of the comnmunications; and
   the destination device operable to receive the information, to encrypt a first message for communication to the initiating device using the identified algorithm, and to decrypt a second message received by the destination device using the identified algorithm.

3. The system of claim 2, wherein:
   the initiating device is further operable to decrypt the first message using the identified algorithm and to encrypt the second message using the identified algorithm; and
   the initiating device and the destination device are further operable to establish an encrypted communication link for communicating the first message and the second message.

4. The system of claim 2, wherein:
   the information includes the selected algorithm;
   the initiating device is further operable to store the selected algorithm; and
   the destination device is further operable to store the selected algorithm.

5. The system of claim 2, wherein the request comprises a selection by a user of the initiating device to secure a particular communication session.

6. The system of claim 2, wherein the communication server includes a database operable to store a plurality of potential algorithms for use in encrypting the communications.

7. The system of claim 2, wherein the initiating device includes:
   a user interface operable to receive voice data;
   a storage medium operable to store the identified algorithm; and
   a communication module operable to couple to the user interface, to couple to the storage medium, and to encrypt the voice data using the identified algorithm for communication to the destination device.

8. The system of claim 2, wherein the destination device includes:
   a user interface operable to receive voice data;
   a storage medium operable to store the identified algorithm; and a communication module operable to couple to the user interface, to couple to the storage medium, and to encrypt the voice data using the identified algorithm for communication to the initiating device.

9. A system for securing communications comprising:

an initiating device operable to transmit to a communication server a request for security of communications with a destination device;

the communication server operable to couple to the initiating device and the destination device, to receive the request, to select an algorithm for securing the communications, to transmit to the initiating device information identifying the selected algorithm, to determine that the destination device does not support encryption of the communications, to establish an encrypted link with the initiating device in response to determining that the destination device does not support encryption of the communications, and to establish an unencrypted link with the destination device in response to determining that the destination device does not support encryption of the communications; and the destination device operable to transmit unencrypted messages to the communication server using the unencrypted link and to receive unencrypted messages from the communication server using the unencrypted link.

10. The system of claim 9, wherein:

the initiating device is further operable to receive the information, to encrypt a first message for communication to the destination device through the communication server using the identified algorithm, and to decrypt a second message received from the communication server using the identified algorithm; and the communication server is further operable to decrypt the first message using the identified algorithm, to transmit the unencrypted first message to the destination device using the unencrypted link, to receive the second message from the destination device, to encrypt the second message using the identified algorithm, and to transmit the encrypted second message to the initiating device using the encrypted link.

11. The system of claim 9, wherein:

the information includes the selected algorithm; and the initiating device is further operable to store the selected algorithm.

12. The system of claim 9, wherein the request comprises a selection by a user of the initiating device to secure a particular communication session.

13. The system of claim 9, wherein the communication server includes a database operable to store a plurality of potential algorithms for use in encrypting the communications.

14. The system of claim 9, wherein the initiating device includes:

a user interface operable to receive voice data;

a storage medium operable to store the identified algorithm; and a communication module operable to couple to the user interface, to couple to the storage medium, and to encrypt the voice data using the identified algorithm for communication to the communication server.

15. The system of claim 9, wherein the destination device includes:

a user interface operable to receive voice data; and a communication module operable to couple to the user interface and to transmit the voice data to the communication server.

16. A system for securing communications comprising:

an initiating device operable to transmit a request for encryption of communications with a destination device; and a communication server operable to receive the request from the initiating device and to determine if the destination device supports encryption of the communications;

wherein, in response to determining that the destination device supports encryption of the communications, the communication server is further operable to facilitate establishment of an encrypted link between the initiating device and the destination device; and wherein, in response to determining that the destination device does not support encryption of the communications, the communication server is further operable to establish an encrypted link between the initiating device and the communication server and to establish an unencrypted link between the communication server and the destination device.

17. The system of claim 16, wherein facilitating establishment of the encrypted link between the initiating device and the destination device includes selecting an algorithm for encrypting the communications and transmitting to the initiating device and the destination device information identifying the selected algorithm.

18. The system of claim 17, wherein:

the information includes the selected algorithm; and the initiating device is further operable to store the selected algorithm.

19. The system of claim 16, wherein:

establishing the encrypted link between the initiating device and the communication server includes selecting an algorithm for encrypting the communications and transmitting to the initiating device information identifying the selected algorithm; and establishing the unencrypted link between the communication server and the destination device includes transmitting an unencrypted message from the communication server to the destination device.

20. The system of claim 19, wherein:

the information includes the selected algorithm; and the initiating device is further operable to store the selected algorithm.

21. The system of claim 16, wherein the communication server includes a database operable to store a plurality of algorithms for use in encrypting the communications.

22. The system of claim 16, wherein the initiating device includes:

a user interface operable to receive voice data;

a storage medium operable to store a plurality of algorithms for use in encrypting the communications; and a communication module operable to couple to the user interface, to couple to the storage medium, and to encrypt the voice data using an identified algorithm for communication to the communication server.

23. The system of claim 22, wherein the request comprises a selection by a user of the initiating device to secure a particular communication session.

24. A method for securing communications comprising:

receiving from an initiating device a request for encryption of communications with a destination device;

determining if the destination device supports encryption of the communications;

in response to determining that the destination device supports encryption of the communications, facilitating establishment of an encrypted link between the initiating device and the destination device;

in response to determining that the destination device does not support encryption of the communications:
  establishing an encrypted link between the initiating device and a communication server; and
  establishing an unencrypted link between the communication server and the destination device.

25. The method of claim 24, wherein facilitating establishment of the encrypted link between the initiating device and the destination device includes:
  selecting an algorithm for encrypting the communications; and
  transmitting to the initiating device and the destination device information identifying the selected algorithm.

26. The method of claim 25, wherein:
  the information includes the selected algorithm; and
  the initiating device is operable to store the selected algorithm.

27. The method of claim 24, wherein:
  establishing the encrypted link between the initiating device and the communication server includes:
    selecting an algorithm for encrypting the communications; and
    transmitting to the initiating device information identifying the selected algorithm; and
  establishing the unencrypted link between the communication server and the destination device includes:
    transmitting an unencrypted message from the communication server to the destination device.

28. The method of claim 27, wherein:
  the information includes the selected algorithm; and
  the initiating device is operable to store the selected algorithm.

29. The method of claim 24, wherein the communication server includes a database operable to store a plurality of algorithms for use in encrypting the communications.

30. The method of claim 24, wherein the initiating device includes:
  a user interface operable to receive voice data;
  a storage medium operable to store a plurality of algorithms for use in encrypting the communications; and
  a communication module operable to couple to the user interface, to couple to the storage medium, and to encrypt the voice data using an identified algorithm for communication to the communication server.

31. The method of claim 30, wherein the request comprises a selection by a user of the initiating device to secure a particular communication session.

32. Logic for securing communications comprising, the logic encoded in media and operable when executed to:
  receive from an initiating device a request for encryption of communications with a destination device;
  determine if the destination device supports encryption of the communications;
  in response to determining that the destination device supports encryption of the communications, facilitate establishment of an encrypted link between the initiating device and the destination device;
  in response to determining that the destination device does not support encryption of the communications:
    establish an encrypted link between the initiating device and a communication server; and
    establish an unencrypted link between the communication server and the destination device.

33. The logic of claim 32, wherein facilitating establishment of the encrypted link between the initiating device and the destination device includes:
  selecting an algorithm for encrypting the communications; and
  transmitting to the initiating device and the destination device information identifying the selected algorithm.

34. The logic of claim 33, wherein:
  the information includes the selected algorithm; and
  the initiating device is operable to store the selected algorithm.

35. The logic of claim 32, wherein:
  establishing the encrypted link between the initiating device and the communication server includes:
    selecting an algorithm for encrypting the communications; and
    transmitting to the initiating device information identifying the selected algorithm; and
  establishing the unencrypted link between the communication server and the destination device includes:
    transmitting an unencrypted message from the communication server to the destination device.

36. The logic of claim 35, wherein:
  the information includes the selected algorithm; and
  the initiating device is operable to store the selected algorithm.

37. The logic of claim 32, wherein the communication server includes a database operable to store a plurality of algorithms for use in encrypting the communications.

38. The logic of claim 32, wherein the initiating device includes:
  a user interface operable to receive voice data;
  a storage medium operable to store a plurality of algorithms for use in encrypting the communications; and
  a communication module operable to couple to the user interface, to couple to the storage medium, and to encrypt the voice data using an identified algorithm for communication to the communication server.

39. The logic of claim 38, wherein the request comprises a selection by a user of the initiating device to secure a particular communication session.

40. A system for securing communications comprising:
  means for receiving from an initiating device a request for encryption of communications with a destination device;
  means for determining if the destination device supports encryption of the communications;
  in response to determining that the destination device supports encryption of the communications, means for facilitating establishment of an encrypted link between the initiating device and the destination device;
  in response to determining that the destination device does not support encryption of the communications:
    means for establishing an encrypted link between the initiating device and a communication server; and
    means for establishing an unencrypted link between the communication server and the destination device.

41. The system of claim 40, wherein the means for facilitating establishment of the encrypted link between the initiating device and the destination device includes:
  means for selecting an algorithm for encrypting the communications; and
  means for transmitting to the initiating device and the destination device information identifying the selected algorithm.

* * * * *